United States Patent Office 2,717,235
Patented Sept. 6, 1955

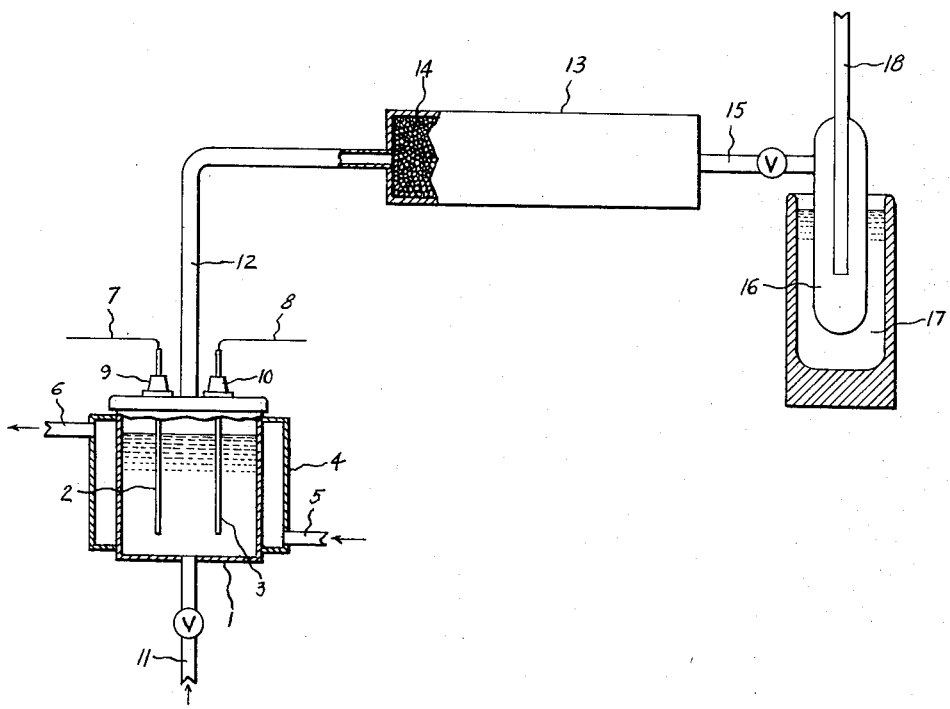

2,717,235

METHOD OF PREPARING SULFUR HEXAFLUORIDE

Maurice Prober, Schenectady, N. Y., assignor to General Electric Company, a corporation of New York Application November 23, 1951, Serial No. 257,693

5 Claims. (Cl. 204—59)

The present invention comprises a method of preparing sulfur hexafluoride by the electrolysis of anhydrous hydrogen fluoride while such fluoride is in contact with a covalent sulfur compound. Heretofore, sulfur hexafluoride has been prepared by reactions involving the handling of elemental fluorine gas. Because of its violent reactivity and its poisonous and corrosive characteristic, elemental fluorine is undesirable for use as a reagent for carrying out chemical reactions.

In accordance with my invention, a covalent binary sulfur compound, as for example, hydrogen sulfide is conducted into a liquid current-carrying electrolyte containing substantially anhydrous hydrogen fluoride and also a conductivity-inducing reagent. As a result of electrolysis under these conditions at a cell voltage insufficient to generate free fluorine, chemical reactions occur whereby are formed sulfur hexafluoride and by-products which may be readily removed.

The accompanying drawing shows diagrammatically an apparatus for carrying out my invention.

Referring to the drawing, the electrolytic cell 1, which preferably consists of nickel, or of a metal which is coated with nickel, is provided with insoluble electrodes 2, 3 which also may consist of nickel. One of these electrodes serves as the anode and the other serves as the cathode. Surrounding the cell 1 is a jacket 4 which is provided with an inlet conduit 5 and an outlet conduit 6 for the circulation of a suitable cooling fluid, as for example, refrigerated alcohol. Connected to the electrodes 2, 3 are energy-supplying conductors 7, 8 which are electrically insulated by suitable bushings 9, 10. The electrolytic cell also is provided with a valved inlet conduit 11 and an outlet conduit 12. During operation of the electrolyzing process, a carrier gas, for example, hydrogen, and a covalent sulfur-containing gas for example, hydrogen sulfide, are conducted into the electrolyzing chamber, the gas coming into contact with the electrodes and the liquid charge while current is conducted therethrough. By covalent sulfur compounds I mean to include covalently bonded sulfur compounds which in the pure liquid state conduct electricity poorly. The outlet conduit 12 conducts gaseous products from the cell 1 to a chamber 13 containing a reagent 14, for example, sodium fluoride, for removing unreacted hydrogen fluoride which may be carried away with reaction products.

With the cell 1 to be charged with liquified hydrogen fluoride and a suitable conductivity-inducing material, as for example, sodium fluoride, and with the cell refrigerated to a temperature of about 0° C. or lower, the passage of unidirectional current between the electrodes in the presence of a covalent sulfur compound results in the formation of compounds of sulfur and fluorine, including as a main reaction product sulfur hexafluoride. For example, direct current having a voltage of about 5 to 6 volts may be utilized in the cell. Hydrogen or nitrogen gas may be used as a carrier gas and the pressure of the carrier gas may be slightly above atmospheric pressure. Should a superatmospheric pressure be employed in the electrolytic cell, then the incoming gas should be at a suitably higher pressure.

The reaction products first are conducted through the chamber 13 containing a material 14 such as sodium fluoride to remove hydrogen fluoride.

Alternatively hydrogen fluoride may be condensed and returned to the reaction space by a reflux condenser (not shown) located, for example, above cell 1. The gaseous products leaving the chamber 13 pass through a valved outlet conduit 15 into a chamber 16 refrigerated, by suitable refrigerant 17, to a temperature of about —100° C. or lower. For example, chamber 16 may be surrounded by liquid nitrogen. Fluoride compounds of sulfur are condensed, the uncondensible products being carried off by the conduit 18. The condensed products mainly consist of sulfur hexafluoride and also lower fluorides of sulfur. The sulfur hexafluoride may be purified by chemical means as by scrubbing with a caustic soda solution and further isolated by fractional distillation. Alternatively the products delivered by conduit 15 may be purified chemically before being condensed and then fractionally distilled.

In place of hydrogen sulfide, other covalent binary sulfur products, for example, carbon disulfide or sulfur monochloride, may be introduced in the liquid state into the electrolyzing cell 1, where reactions are caused to occur by the passage of current. Sulfur hexafluoride is formed which is carried away and separated from other reaction products.

What I claim as new and desire to secure by Letters Patent of the United States is:

1. The method of preparing sulfur hexafluoride in an electrolytic cell with an insoluble anode, which method comprises bringing an inorganic covalent sulfur compound selected from the class consisting of hydrogen sulfide, carbon disulfide and sulfur monochloride into contact with an electrolyte consisting essentially of substantially anhydrous hydrogen fluoride and a conductivity-promoting solute maintained in said electrolytic cell while maintaining a cell voltage insufficient to generate free fluorine, carrying away gaseous reaction products consisting of sulfur hexafluoride and lower fluorides of sulfur, purifying said products and separating sulfur hexafluoride therefrom.

2. The method of claim 1 in which the insoluble anode is constructed of nickel.

3. The method of claim 1 in which the inorganic covalent sulfur compound is hydrogen sulfide.

4. The method of claim 1 in which the inorganic covalent sulfur compound is carbon disulfide.

5. The method of claim 1 in which the cell voltage is about 5 to 6 volts.

References Cited in the file of this patent

UNITED STATES PATENTS 2,519,983    Simons _____ Aug. 22, 1950

OTHER REFERENCES

"Journal of American Chemical Society," vol. 52 (1930), pages 4302 thru 4308, article by Schumb et al.